(12) United States Patent
Pitts

(10) Patent No.: US 6,555,215 B2
(45) Date of Patent: Apr. 29, 2003

(54) UTILITY ACCESSORIES AND SERVICE HARDWARE HAVING LUMINOSITY FOR NON-LIGHTED AND EMERGENCY CONDITIONS

(76) Inventor: Algerome Pitts, P.O. Box 22410, Newark, NJ (US) 07101

( * ) Notice: Subject to any disclaimer, the term of this patent is extended or adjusted under 35 U.S.C. 154(b) by 114 days.

(21) Appl. No.: 09/782,996

(22) Filed: Feb. 14, 2001

(65) Prior Publication Data

US 2002/0150721 A1 Oct. 17, 2002

(51) Int. Cl.$^7$ ............................. B32B 3/00; B32B 3/26
(52) U.S. Cl. ............................ 428/315.5; 428/315.9; 362/34; 362/95; 362/100
(58) Field of Search .................. 428/315.5, 315.9; 362/34, 95, 100

(56) References Cited

U.S. PATENT DOCUMENTS

| | | | | |
|---|---|---|---|---|
| 4,914,554 A | * | 4/1990 | Sowers | 362/100 |
| 5,488,266 A | * | 1/1996 | Aoki et al. | 313/509 |
| 5,672,937 A | * | 9/1997 | Choi et al. | 313/503 |
| 5,698,301 A | * | 12/1997 | Yonetani | 428/213 |
| 6,242,076 B1 | * | 6/2001 | Andriash | 428/138 |

FOREIGN PATENT DOCUMENTS

CH 618762 A5 * 8/1980

* cited by examiner

Primary Examiner—Terrel Morris
Assistant Examiner—Leanna Roché

(57) ABSTRACT

A luminescent composite laminate structure for utility accessories and service hardware having luminosity for emergency and non-lighted conditions in which to illuminate the outer surface of such hardware and accessories. The composite laminate structure includes a plurality of layers for the protection of the luminescent outer surface of the laminated hardware or accessories. An outer first layer is a plastic protective covering for resistance to wear and impact; and the outer first layer is covering an inner second layer and has an inner surface wall in contact with the inner second layer. The inner second layer is a plastic micro-thin covering having a plurality of micro-hole openings for the transfer of oxygen ($O_2$) through the micro hole openings in order to increase visibility of the luminescent outer surface; and the inner second layer is covering an inner core third layer and has an inner surface wall in contact with said inner core third layer. The inner core third layer is a luminescent material coating for providing luminosity to the outer surface of such hardware or accessories; and the inner core third layer coats the outer surface of such hardware and accessories.

9 Claims, 4 Drawing Sheets

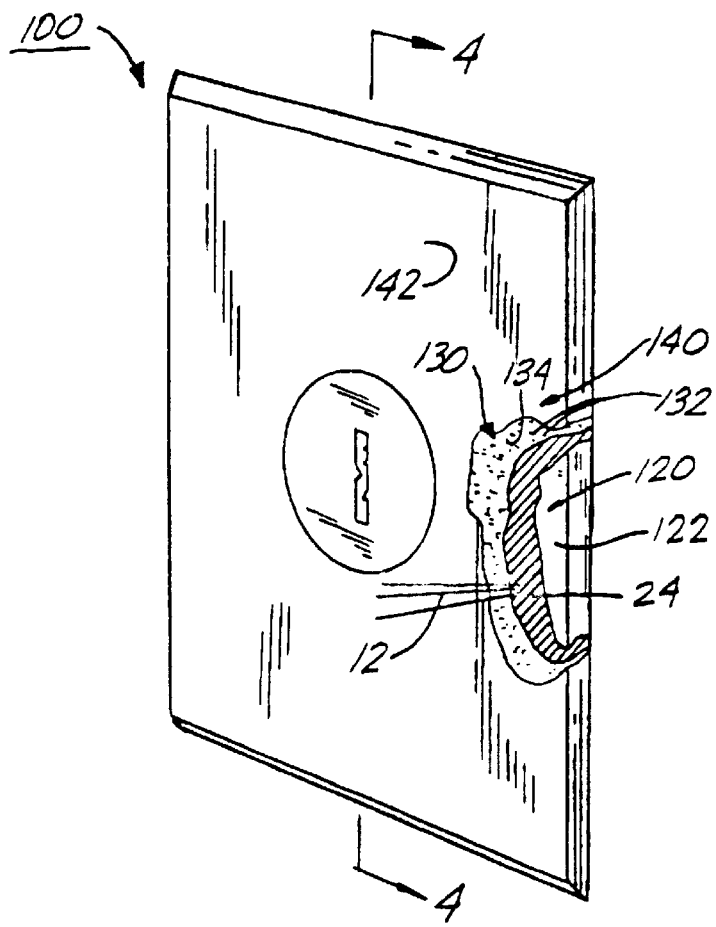
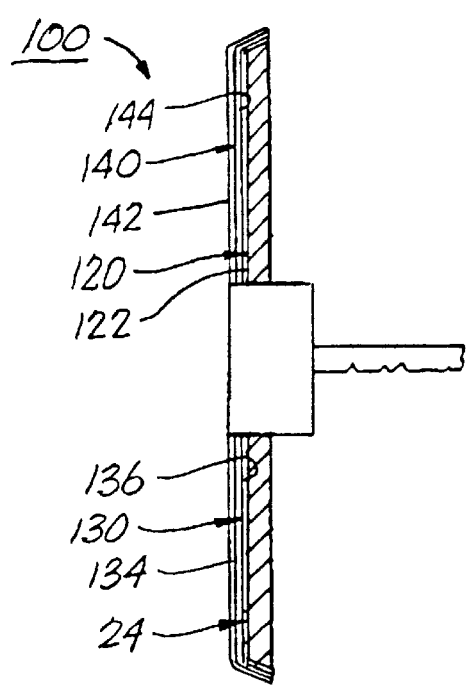
FIG. 3
FIG. 4

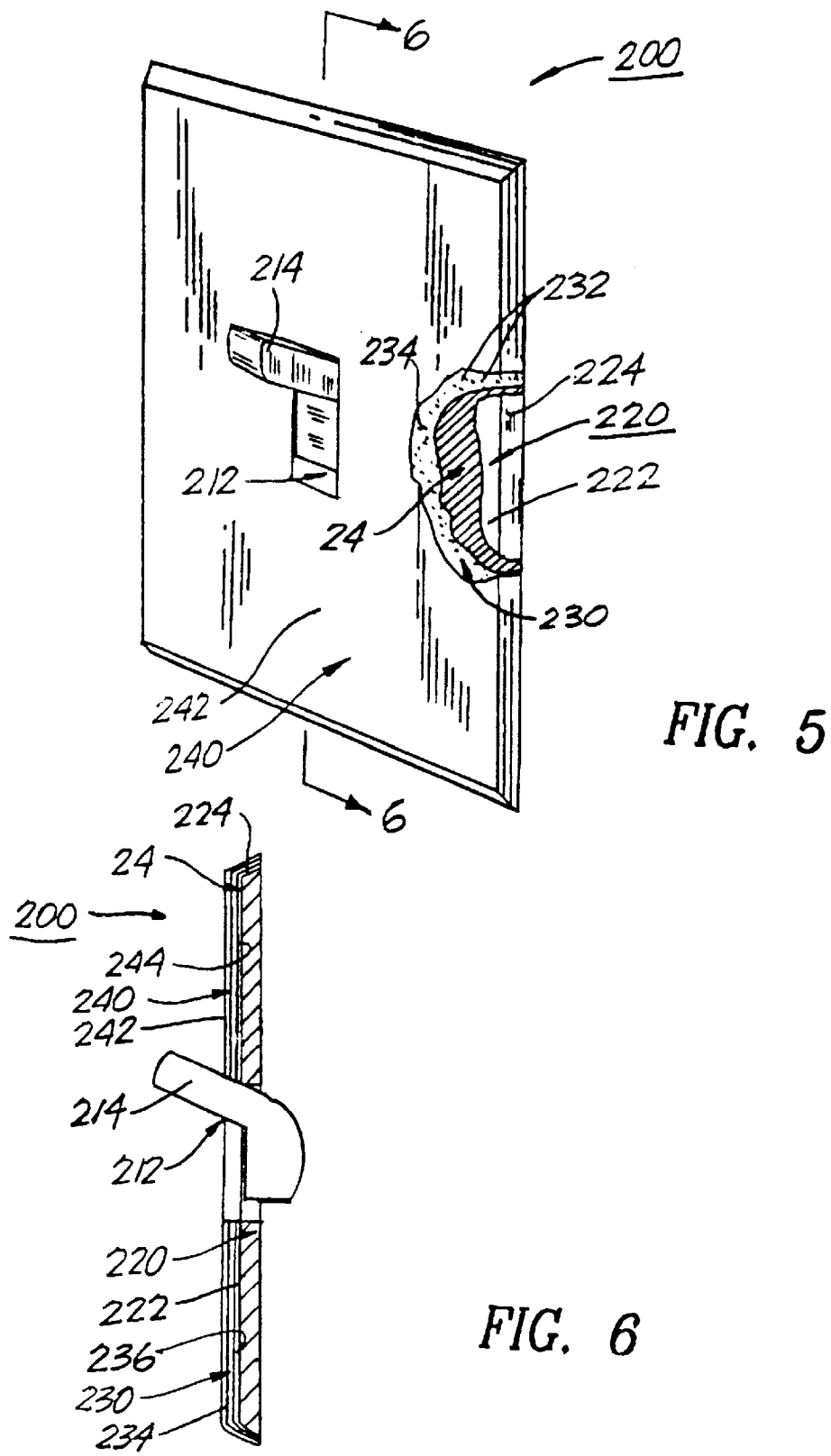

US 6,555,215 B2

UTILITY ACCESSORIES AND SERVICE HARDWARE HAVING LUMINOSITY FOR NON-LIGHTED AND EMERGENCY CONDITIONS

FIELD OF THE INVENTION

This invention relates to hardware, electrical fixtures and houseware accessories having luminosity for emergency and non-lighted conditions in which to illuminate the outer surface of such hardware and accessories, and give them visibility in the absence of any light source. More particularly, to luminescent hardware and electrical fixtures such as door knobs, door locks, switch plates, electrical receptacles and the like, in which the chemiluminescent coating on its outer surface gives the user a source of visible light in order for the user to have access to those items in the absence of any light source during emergency conditions.

BACKGROUND OF THE INVENTION

Frequently, many types of emergency conditions and situations are experienced in homes, offices, stores, industrial plant facilities and commercial establishments involving power failures where an interior or exterior area has no visible light. These power failures may be caused by electrical short circuits, fire, accidents, brown-outs, black-outs natural disasters (such as hurricanes, tornadoes, floods, typhoons, tidal surges, etc. ) or a planned shutdown or shut-off of electricity to a residential dwelling or commercial facility. As a result of these emergencies, most facilities, and especially residential homes, do not have emergency generators, or only emergency light sources (such as lanterns, flash lights, etc.) to provide visible lighting for leaving or entering such buildings during these emergency conditions.

There remains a need for luminescent hardware, utility accessories, electrical fixtures or houseware devices for providing a visible light source in the absence of the any light during an emergency non-lighted conditions in order to provide automatic and natural illumination to an area when a power failure occurs. Examples of such luminescent hardware and electrical fixtures can be in the form of door knobs, door locks, switch plates, electrical receptacles and the like.

DESCRIPTION OF THE PRIOR ART

Utility accessories and service hardware having an illumination source during emergency and non-emergency conditions of various designs, styles, structures, configurations and materials of construction have been disclosed in the prior art. For example, U.S. Pat. No. 4,514,789 discloses a housing on a switch plate having an LED to locate a light switch in the dark. U.S. Pat. No. 4,611,264 discloses a housing adhesively attached to a switch plate having a light to locate the light switch in the dark. The housing can be removed and used as a flashlight. These prior art patents do not disclose the structure and design of a luminescent coating on the outer surface wall of a switch plate as shown in the present invention.

U.S. Pat. Nos. 2,308,844; 3,719,812; and 4,777,570 all disclose a light source such as a light bulb being mounted within the knob section of a door knob having a clear plastic cover. These prior art patents do not disclose the structure and design of a luminescent coating on the knob section of a door knob as shown in the present invention.

None of the prior art patents teach or disclose utility accessories or service hardware having a luminescent outer surface for providing a luminescent (visible) light source in which to locate such devices or hardware in the absence of any type of light source.

Accordingly, it is an object of the present invention to provide for utility accessories, service hardware, electrical fixtures, and houseware devices having luminosity in order to give such items visibility in the absence of any light source for non-lighted and emergency conditions.

Another object of the present invention is to provide a chemiluminescent coating to the outer surface of service hardware and utility accessories in order to illuminate and give them visibility when no visible light is present.

Another object of the present invention is to provide a chemiluminescent coating to such service hardware and utility accessories that include door knobs, door locks, switch plates, electrical receptacle sand the like.

Another object of the present invention is to provide a luminescent outer surface to such aforementioned devices in order to give visible light source to such devices in an interior or exterior area having a minimum or complete absence of light.

Another object of the present invention is to provide a luminescent outer surface having a coating made from luminescent chemical materials selected from the group consisting of white phosphorous, red phosphorous, phosphors, organic guanine (fish scales), metallic and non-metallic micas, bismuth oxychloride, phosphorous oxychloride, or other chemiluminescent materials.

Another object of the present invention is to provide a luminescent outer surface that produces a light source from a chemiluminescent material which glows white, red, yellow green in the absence of light.

Another object of the present invention is to provide a micro-thin screen cover having a color tint, in which to enhance the luminescent outer surface of such devices in order for the chemiluminescent material coating to be better observed by the user in the absence of any other light source.

Another object of the present invention is to provide a shell protective cover for protecting the luminescent material coating on the outer surfaces of the aforementioned devices from wearing off or deteriorate through normal use and handling.

Another object of the present invention is to provide a luminescent outer surface having a chemiluminescent coating that is long-lasting, durable in use, and reliable for producing a light source in the absence of light.

A further object of the present invention is to provide a chemiluminescent coating on the outer surface of such aforementioned devices where such luminescent material coating may be mass produced in an automated and economical manner on such devices and is readily affordable by the consumer.

SUMMARY OF THE INVENTION

In accordance with the present invention, there is provided a luminescent composite laminate structure for utility accessories and service hardware having luminosity for emergency and non-lighted conditions in which to illuminate the outer surface of such hardware are and accessories. The composite laminate structure includes a plurality of layers for the protection of the luminescent outer surface of the laminated hardware or accessories. The plurality of layers include an outer first layer, an inner second layer and an inner core third layer for covering the outer surface of such hardware or accessories. The outer first layer is a plastic protective covering for resistance to wear and impact; and the outer first layer is covering the inner second layer and has an inner surface wall in contact with the inner second layer. The inner second layer is a plastic micro-thin covering having a plurality of micro-hole openings for the transfer of oxygen ($O_2$) through the micro hole openings in order to increase visibility of the luminescent outer surface: and the inner second layer is covering the inner third layer and having an inner surface wall in contact with said inner core third layer. The inner core third layer is a luminescent material coating for providing luminosity to the outer surface of such hardware or accessories; and the inner core third layer is coating the outer surface of such hardware and accessories.

BRIEF DESCRIPTION OF THE DRAWINGS

Further objects, features, and advantages of the present invention will become apparent upon the consideration of the following detailed description of the present-preferred embodiment when taken in conjunction with the accompanying drawings, wherein:

FIG. 3 is a front perspective view of the door lock with a chemiluminescent coating of the second alternate embodiment of the present invention showing a partial breakaway of each layer being the chemiluminescent material coating, the micro-thin screen cover having micro hole openings therein, and the shell protective cover thereon;

FIG. 4 is an enlarged cross-sectional view of the door lock with a chemiluminescent coating of the second alternate embodiment of the present invention taken along lines 4—4 of FIG. 3 showing each of the layers being the metal wall of the door lock, the chemiluminescent material coating on the metal wall, the micro-thin screen cover having micro hole openings, and the shell protective cover thereon;

FIG. 5 is a front perspective view of the switch plate with a chemiluminescent coting of the third alternate embodiment of the present invention showing a partial breakaway of each layer being the chemiluminescent material coating, the micro-thin screen cover having micro hole openings therein, and the shell protective cover thereon;

FIG. 6 is an enlarged cross-sectional view of the switch plate with a chemiluminescent coating of the third alternate embodiment of the present invention taken along lines 6—6 of FIG. 5 showing each of the layers being the metal wall of the switch plate, the chemiluminescent material coating on the metal wall, the micro-thin screen cover having micro hole openings, and the shell protective cover thereon;

| \multicolumn{2}{c}{LIST OF REFERENCE NUMBERS UTILIZED IN DRAWINGS} |  |
|---|---|
| Part No. | DESCRIPTION OF THE COMPONENT PARTS |
| \multicolumn{2}{c}{FIRST ALTERNATE EMBODIMENT} |  |
| 10 | Door knob |
| 12 | Visible light source |
| 14 | Oxygen ($O_2$) |
| 20 | Knob housing having an |
| 22 | Outer wall surface |
| 24 | A chemiluminescent material coating |
| 26 | Knob section |
| 28 | Neck extension section |
| 30 | A micro-thin screen cover having |
| 32 | Micro hole openings therein; and also |
| 34 | Having an outer wall surface and |
| 36 | An interior wall surface |
| 40 | A protective shell covering having |
| 42 | An outer wall surface and |
| 44 | An interior wall surface |
| \multicolumn{2}{c}{SECOND ALTERNATE EMBODIMENT} |  |
| 100 | Door lock |
| 12 | Visible light source |
| 120 | Lock housing having an |
| 122 | Outer wall surface |
| 24 | A chemiluminescent material coating |
| 130 | A micro-thin screen cover having |
| 132 | Micro hole openings therein, and also |
| 134 | Having an outer wall surface, and |
| 136 | An interior wall surface |
| 140 | A protective shell covering having |
| 142 | An outer wall surface, and |
| 144 | An interior wall surface |
| \multicolumn{2}{c}{THIRD ALTERNATE EMBODIMENT} |  |
| 200 | Switch plate |
| 212 | Switch opening |
| 214 | Switch |
| 220 | Plate housing having an |
| 222 | Outer wall surface |
| 224 | A beveled perimeter edge |
| 24 | A chemiluminescent material coating |
| 230 | A micro-thin screen cover having |
| 232 | Micro hole openings therein, and also |
| 234 | Having an outer wall surface and |
| 236 | An interior wall surface |
| 240 | A protective shell covering having |
| 242 | An outer wall surface and |
| 244 | An interior wall surface |
| \multicolumn{2}{c}{FOURTH ALTERNATE EMBODIMENT} |  |
| 300 | Electrical wall receptacle/socket |
| 312 | Socket openings |
| 314 | Socket openings |
| 316 | Socket receptacle |
| 318 | Socket receptacle |
| 12 | Visible light source |
| 320 | Receptacle housing having an |
| 322 | Outer wall surface |
| 324 | A beveled perimeter edge |
| 24 | A chemiluminescent material coating |
| 330 | A micro-thin screen cover having |
| 332 | Micro hole openings therein, and also |

-continued

LIST OF REFERENCE NUMBERS UTILIZED IN DRAWINGS

| Part No. | DESCRIPTION OF THE COMPONENT PARTS |
|---|---|
| 334 | Having an outerwall surface and |
| 336 | An interior wall surface |
| 340 | A protective shell covering having |
| 342 | An outer wall surface and |
| 344 | An interior wall surface |

DETAILED DESCRIPTION OF THE EMBODIMENTS

Overview

Figure 1:
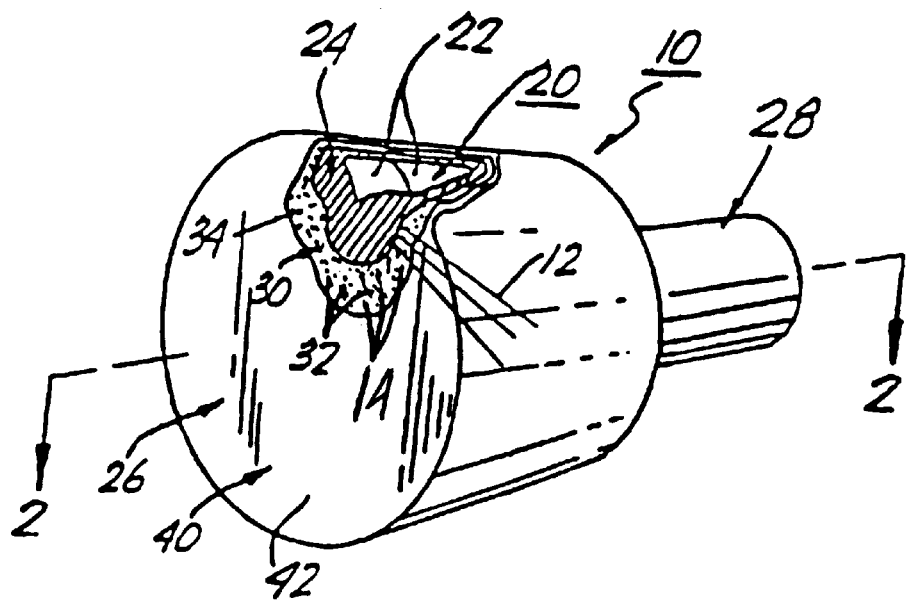
FIG. 1 is a front perspective view of the door knob with a chemiluminescent coating of the first alternate embodiment of the present invention showing a partial breakaway of each layer being the chemiluminescent material coating, the micro-thin screen cover having micro hole openings therein, and the shell protective cover thereon.
Figure 2:
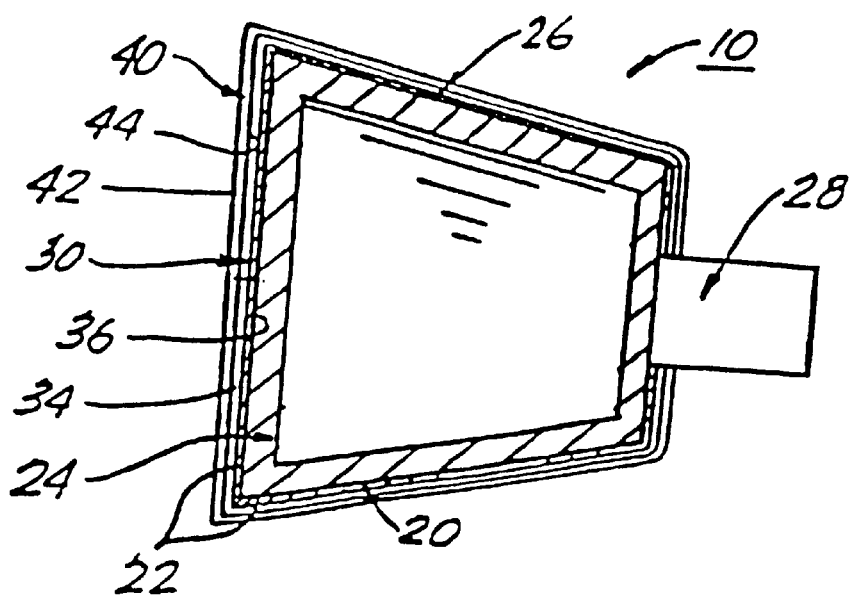
FIG. 2 is an enlarged cross-sectional view of the door knob with a chemiluminescent coating of the first alternate embodiment of the present invention taken along lines 2—2 of FIG. 1 showing each of the layers being the metal wall of the door knob, the chemiluminescent material coating on the metal wall, the micro-thin screen cover having micro hole openings, and the shell protective cover thereon.

The door knob 10 having luminosity for non-lighted and emergency conditions of the first alternate embodiment of the present invention are represented in detail by FIGS. 1 and 2 of the patent drawings. The door knob 10 includes a chemiluminescent material coating 24 on the outer wall surface 22 of the door knob housing 20, such that the chemiluminescent material coating 24 provides a visible light source 12 in which to locate the door knob 10 in the absence of any light.

The door lock 100 having luminosity for non-lighted and emergency conditions of the second alternate embodiment of the present invention are represented in detail by FIGS. 3 and 4 of the patent drawings. The door lock 100 includes a chemiluminescent material coating 24 on the outer wall surface 122 of the door lock housing 120, such that the chemiluminescent material coating 24 provides a visible light source 12 in which to locate the door lock 100 in the absence of any light. All aspects of this second alternate embodiment 100 are the same as the first alternate embodiment of the door knob 10, except for the configuration and structure of the door lock 100 (but having the same chemiluminescent material coating 24 thereon).

The switch plate 200 having luminosity for non-lighted and emergency conditions of the third alternate embodiment of the present invention are represented in detail by FIGS. 5 and 6 of the patent drawings. The switch plate 200 includes a chemiluminescent material coating 24 on the outer wall surface 222 of the switch plate housing 220, such that the chemiluminescent material coating 24 provides a visible light source 12 in which to locate the switch plate 200 in the absence of any light. All aspects of this third alternate embodiment of the switch plate 200 are the same as the first alternate embodiment of the door knob 10, except for the configuration and structure of the switch plate 200 (but having the same chemiluminescent material coating 24 thereon).

Figure 7:
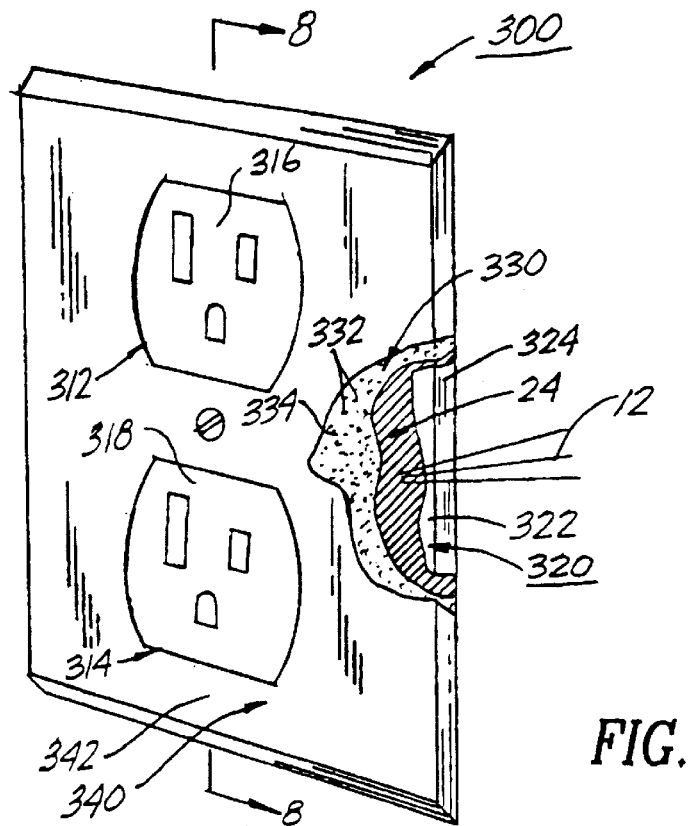
FIG. 7 is a front perspective view of the electrical wall receptacle with a chemiluminescent coating of the fourth alternate embodiment of the present invention showing a partial breakaway of each layer being the chemiluminescent material coating, the micro-thin screen cover having micro hole openings therein, and the shell protective cover thereon.
Figure 8:
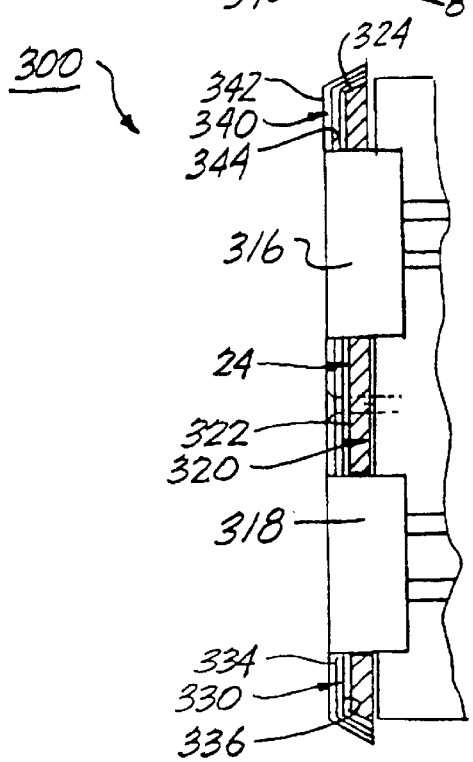
FIG. 8 is an enlarged cross-sectional view of the electrical wall receptacle with a chemiluminescent coating of the fourth alternate embodiment of the present invention taken along lines 8—8 of FIG. 7 showing each of the layers being the metal wall of the electrical wall receptacle, the chemiluminescent material coating on the metal wall, the micro-thin screen cover having micro hole openings, and the shell protective cover thereon.

The electrical wall receptacle/socket 300 having luminosity for non-lighted and emergency conditions of the fourth alternate embodiment of the present invention are represented in detail by FIGS. 7 and 8 of the patent drawings. The wall receptacle 300 includes a chemiluminescent material coating 24 on the outer wall surface 322 of the receptacle housing 320, such that the chemiluminescent material coating 24 provides a visible light source 12 in which to locate the wall receptacle 300 in the absence of any light. All aspects of this fourth alternate embodiment of wall receptacle 300 are the same as the first alternate embodiment of the door knob 10, except for the configuration and structure of the wall receptacle 300 (but having the same chemiluminescent material coating thereon).

The outer wall surfaces 22, 122, 222 and 322 of service hardware devices 10, 100, 200 and 300 have thereon a layer of chemiluminescent coating 24 for providing a light source 12 in which to locate each of the service hardware devices 10, 100, 200 and 300 in the absence of light. The chemiluminescent coating 24 has a layer thickness in the range of 5 mils to 20 mils on the outer wall surfaces 22, 122, 222 and 322 of service hardware devices 10, 100, 200 and 300 thereof. The luminescent coating 24 for providing the light source 12 are made from chemiluminescent chemical materials selected from the group consisting of white phosphorous, red phosphorous, phosphors, organic guanines, metallic and non-metallic micas, bismuth oxychloride, phosphorous oxychloride or other chemiluminescent materials. Light source 12 provided by the aforementioned luminescent chemical materials produces a light source which glows white, red, yellow or green in the absence of light.

First Alternate Embodiment 10

The door knob 10 having luminosity for non-lighted areas and emergency conditions of the first alternate embodiment are depicted in detail by FIGS. 1 and 2 of the patent drawings. The door knob 10 includes a door knob housing 20 having an outer wall surface 22 with a chemiluminescent material coating 24 thereon. The chemiluminescent coating 24 coats the knob section 26 and the neck extension section 28 of the knob housing with a layered thickness in the range of 5 mils to 20 mils of coating.

Door knob 10 also includes a conformed micro-screen cover 30 having a plurality, of micro hole openings 32 therein. Micro-screen cover 30 includes an outer wall surface 34 and an interior wall surface 36. The interior wall surface 36 of the conformed micro-screen cover 30 surrounds the luminescent material coating 24 on the outer wall surfaces 22 of door knob 10. The plurality of micro hole openings 32 allows the chemiluminescent material coating 24 to be better observed by the transfer of oxygen ($O_2$) 14 through the micro hole openings 32 of micro screen cover 30. The micro-screen cover 30 can be made from a very thin plastic or mylar sheet having a wall thickness in the range of 2 mils to 5 mils depending upon the application of the service hardware being coated. The plastic or mylar sheet can be clear or color tinted with such colors being red, yellow, orange, green, pink or white, for example in order to change luminescent material coating 24 that is already a white luminescent color to a green luminescent color.

The shell protective covering 40 includes an outer wall surface 42 and an interior wall surface 44. Outer wall surface 42 is the contact surface by the user. Interior wall surface 44 of the shell protective covering 40 is adjacent and in contact with the outer wall surface 34 of the micro-screen cover 30. The shell protective covering 40 can be made from a very thin and transparent plastic or mylar sheet having a wall thickness in the range of 2 mils to 5 mils depending upon the service hardware in use.

Second Alternate Embodiment 100

The door lock 100 having luminosity for non-lighted areas and emergency conditions of the second alternate embodiment are depicted in detail by FIGS. 3 and 4 of the patent drawings. The door lock 100 includes a door lock housing 120 having an outer wall surface 122 with a chemiluminescent material coating 24 thereon. The chemiluminescent coating 24 also coats the lock section member 124 and the key insertion opening 126 of the door lock housing 120 with a layered thickness in the range of 5 mils to 20 mils of coating.

Door lock 100 also includes a conformed micro-screen cover 130 having a plurality of micro hole openings 132 therein. Micro-screen cover 130 includes an outer wall surface 134 and an interior wall surface 136. The interior wall surface 136 of the conformed micro-screen cover 130 surrounds the luminescent material coating 24 on the outer wall surfaces 122 of door lock 100. The plurality of micro hole openings 132 allows the chemiluminescent material coating 24 to be better observed by the transfer of oxygen ($O_2$) 14 through the micro hole openings 132 of micro screen cover 130. The micro-screen cover 130 can be made from a very thin plastic or mylar sheet having a wall thickness in the range of 2 mils to 5 mils depending upon the application of the service hardware being coated. The plastic or mylar sheet can be clear or color tinted with such colors being red, yellow, orange, green, pink or white, for example in order to change luminescent material coating 24 that is already a white luminescent color to a green luminescent color.

The shell protective covering 140 includes an outer wall surface 142 and an interior wall surface 144. Outer wall surface 142 is the contact surface by the user. Interior wall surface 144 of the shell protective covering 140 is adjacent and in contact with the outer wall surface 134 of the micro-screen cover 130. The shell protective covering 140 can be made from a very thin and transparent plastic or mylar sheet having a wall thickness in the range of 2 mils to 5 mils depending upon the service hardware in use.

Third Alternate Embodiment 200

The switch plate 200 having luminosity for non-lighted areas and emergency conditions of the third alternate embodiment are depicted in detail by FIGS. 5 and 6 of the patent drawings. Switch plate 200 includes a switch opening 212 for receiving switch 214 as shown in FIG. 5 of the drawings. The switch plate 200 includes a switch plate housing 220 having an outer wall surface 22 with a chemiluminescent material coating 24 thereon. The chemiluminescent coating 24 coats the knob section 26 and the neck extension section 28 of the knob housing with a layered thickness in the range of 5 mils to 20 mils of coating.

Switch plate 200 also includes a conformed micro-screen cover 230 having a plurality of micro hole openings 232 therein. Micro-screen cover 230 includes an outer wall surface 234 and an interior wall surface 236. The interior wall surface 236 of the conformed micro-screen cover 230 surrounds the luminescent material coating 24 on the outer wall surfaces 222 of switch plate 200. The plurality of micro hole openings 232 allows the chemiluminescent material coating 24 to be better observed by the transfer of oxygen ($O_2$) 14 through the micro hole openings 232 of micro screen cover 230. The micro-screen cover 30 can be made from a very thin plastic or mylar sheet having a wall thickness in the range of 2 mils to 5 mils depending upon the application of the service hardware being coated. The plastic or mylar sheet can be clear or color tinted with such colors being red, yellow, orange, green, pink or white, for example in order to change luminescent material coating 24 that is already a white luminescent color to a green luminescent color.

The shell protective covering 240 includes an outer wall surface 242 and an interior wall surface 244. Outer wall surface 242 is the contact surface by the user. Interior wall surface 244 of the shell protective covering 240 is adjacent and in contact with the outer wall surface 234 of the micro-screen cover 230. The shell protective covering 240 can be made from a very thin and transparent plastic or mylar sheet having a wall thickness in the range of 2 mils to 5 mils depending upon the service hardware in use.

Fourth Alternate Embodiment 300

The electrical wall receptacle/socket 300 having luminosity for non-lighted areas and emergency conditions of the fourth alternate embodiment are depicted in detail by FIGS. 7 and 8 of the patent drawings. The electrical wall receptacle/socket 300 includes socket openings 312 and 314 for receiving socket receptacles 316 and 318 respectively, as shown in FIG. 7 of the drawings. The electrical wall receptacle/socket 300 includes a receptacle housing 320 having an outer wall surface 322 and a beveled perimeter edge 324 with a chemiluminescent material coating 24 thereon. The receptacle housing 320 has a layered thickness in the range of 5 mils to 20 mils of coating 24.

Electrical wall receptacle/socket 300 also includes a conformed micro-screen cover 330 having a plurality of micro hole openings 332 therein. Micro-screen cover 330 includes an outer wall surface 334 and an interior wall surface 336. The interior wall surface 336 of the conformed micro-screen cover 330 surrounds the luminescent material coating 24 on the outer wall surfaces 322 of electrical wall receptacle/socket 300. The plurality of micro hole openings 332 allows the chemiluminescent material coating 24 to be better observed by the transfer of oxygen ($O_2$) 14 through the micro hole openings 332 of micro screen cover 300. The micro-screen cover 330 can be made from a very thin plastic or mylar sheet having a wall thickness in the range of 2 mils to 5 mils depending upon the application of the service hardware being coated. The plastic or mylar sheet can be clear or color tinted with such colors being red, yellow, orange, green, pink or white, for example in order to change luminescent material coating 24 that is already a white luminescent color to a green luminescent color.

The shell protective covering 340 includes an outer wall surface 342 and an interior wall surface 344. Outer wall surface 342 is the contact surface by the user. Interior wall surface 344 of the shell protective covering 340 is adjacent and in contact with the outer wall-surface 334 of the micro-screen cover 330. The shell protective covering 340 can be made from a very thin and transparent plastic or mylar sheet having a wall thickness in the range of 2 mils to 5 mils depending upon the service hardware in use.

ADVANTAGES OF THE PRESENT INVENTION

Accordingly, an advantage of the present invention is that it provides for utility accessories, service hardware, electrical fixtures, and houseware devices having luminosity in order to give such items visibility in the absence of any light source for non-lighted and emergency conditions.

Another advantage of the present invention is that it provides for a chemiluminescent coating to the outer surface of service hardware and utility accessories in order to illuminate and give them visibility when no visible light is present.

Another advantage of the present invention is that it provides for a chemiluminescent coating to such service hardware and utility accessories that include door knobs, door locks, switch plates, electrical receptacle sand the like.

Another advantage of the present invention is that it provides for a luminescent outer surface to such aforementioned devices in order to give visible light source to such devices in an interior or exterior area having a minimum or complete absence of light.

Another advantage of the present invention is that it provides for a luminescent outer surface having a coating made from luminescent chemical materials selected from the group consisting of white phosphorous, red phosphorous, phosphors, organic guanine (fish scales), metallic and non-metallic micas, bismuth oxychloride, phosphorous oxychloride, or other chemiluminescent materials.

Another advantage present invention is that it provides for a luminescent outer surface that produces a light source from a chemiluminescent material which glows white, red, yellow green in the absence of light.

Another advantage of the present invention is that it provides for a micro-thin screen cover having a color tint, in which to enhance the luminescent outer surface of such devices in order for the chemiluminescent material coating to be better observed by the user in the absence of any other light source.

Another advantage of the present invention is that it provides for a shell protective cover for protecting the luminescent material coating on the outer surfaces of the aforementioned devices from wearing off or deteriorate through normal use and handling.

Another advantage of the present invention is that it provides for a luminescent outer surface having a chemiluminescent coating that is long-lasting, durable in use, and reliable for producing a light source in the absence of light.

A further advantage of the present invention is that it provides for a chemiluminescent coating on the outer surface of such aforementioned devices where such luminescent material coating may be mass produced in an automated and economical manner on such devices and is readily affordable by the consumer.

A latitude of modification, change, and substitution is intended in the foregoing disclosure, and in some instances, some features of the invention will be employed without a corresponding use of other features. Accordingly, it is appropriate that the appended claims be construed broadly and in a matter consistent with the spirit and scope of the invention herein.

What is claimed is:

1. A luminescent composite laminate structure for utility accessories and service hardware having luminosity for emergency and non-lighted conditions in which to illuminate the outer surface of such hardware and accessories, comprising:

a) a composite laminate structure having a plurality of layers for the protection of the luminescent outer surface of the laminated hardware or accessories;

b) said plurality of layers including an outer first layer, an inner second layer and an inner core third layer for covering the outer surface of such hardware or accessories;

c) said outer first layer being a plastic protective covering for resistance to wear and impact; and said outer first layer covering said inner second layer and having an inner surface wall in contact with said inner second layer;

d) said inner second layer being a plastic micro-thin covering having a plurality of micro-hole openings for the transfer of oxygen ($O_2$) through said micro hole openings in order to increase visibility of said luminescent outer surface: and said inner second layer covering said inner third layer and having an inner surface wall in contact with said inner core third layer; and e) said inner core third layer being a luminescent material coating for providing luminosity to the outer surface of such hardware or accessories; and said inner core third layer coating the outer surface of such hardware and accessories.

2. A luminescent composite laminate structure in accordance with claim 1, wherein said outer first layer is transparent.

3. A luminescent composite laminate structure in accordance with claim 1, Wherein said outer first layer has a wall thickness in the range of 2 mils to 5 mils.

4. A luminescent composite laminate structure in accordance with claim 1, wherein said inner second layer is clear or color tinted.

5. A luminescent composite laminate structure in accordance with claim 4, wherein said tinted color is selected from the group consisting of red, yellow, orange, green, pink, white and combinations thereof.

6. A luminescent composite laminate structure in accordance with claim 1, wherein said inner second layer has a wall thickness in the range of 2 mils to 5 mils.

7. A luminescent composite laminate structure in accordance with claim 1, wherein said inner core third layer is a luminescent coating material selected from the group consisting of white phosphorous, red phosphorous, phosphors, organic guanine (fish scales), metallic and non-metallic micas, bismuth oxychloride, phosphorous oxychloride, and other chemiluminescent materials.

8. A luminescent composite laminate structure in accordance with claim 1, wherein said inner core third layer has a coating wall thickness in the range of 5 mils to 20 mils.

9. A luminescent composite laminate structure in accordance with claim 1, wherein said utility accessories and service hardware include door knobs, door locks, switch plates and electrical receptacles.

* * * * *